United States Patent
Motomitsu (10) Patent No.: US 11,358,413 B2
(45) Date of Patent: Jun. 14, 2022

(54) BIAS TIRE

(71) Applicant: The Yokohama Rubber Co., LTD., Tokyo (JP)

(72) Inventor: Takamasa Motomitsu, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 208 days.

(21) Appl. No.: 16/335,669

(22) PCT Filed: Oct. 2, 2017

(86) PCT No.: PCT/JP2017/035863
§ 371 (c)(1),
(2) Date: Mar. 21, 2019

(87) PCT Pub. No.: WO2018/066525
PCT Pub. Date: Apr. 12, 2018

(65) Prior Publication Data
US 2019/0308454 A1    Oct. 10, 2019

(30) Foreign Application Priority Data

Oct. 6, 2016  (JP) .............................. JP2016-198204

(51) Int. Cl.
*B60C 15/05* (2006.01)
*B60C 9/06* (2006.01)
(Continued)

(52) U.S. Cl.
CPC .................. *B60C 9/06* (2013.01); *B60C 9/18* (2013.01); *B60C 9/28* (2013.01); *B60C 13/00* (2013.01);
(Continued)

(58) Field of Classification Search
CPC .... B60C 9/18; B60C 9/20; B60C 9/28; B60C 15/05; B60C 2009/0223; B60C 15/06; B60C 15/0607; B60C 2015/0617
See application file for complete search history.

(56) References Cited

U.S. PATENT DOCUMENTS

| | | |
|---|---|---|
| 3,111,976 A | 11/1963 | Gustave |
| 3,301,303 A | 1/1967 | Travers |

(Continued)

FOREIGN PATENT DOCUMENTS

| | | |
|---|---|---|
| CN | 104029564 | 9/2014 |
| DE | 1927047 | * 12/1970 |

(Continued)

OTHER PUBLICATIONS

Machine translation of DE 2737234, 1979.*
(Continued)

*Primary Examiner* — Justin R Fischer
(74) *Attorney, Agent, or Firm* — Thorpe North & Western (57) ABSTRACT

A bias tire includes two or more carcass layers, at least one belt disposed outward from the carcass layers in a tire radial direction, a reinforcing rubber layer disposed between carcass plies included in a carcass layer of the carcass layers. A belt width of a widest belt with the widest width of the belts is 110% or more and 150% or less of a tread developed width, and a position of an upper end portion of the reinforcing rubber layer located outward in the tire radial direction is apart 3 mm or more from an end portion of the widest belt.

13 Claims, 5 Drawing Sheets

(51) Int. Cl.
*B60C 15/06* (2006.01)
*B60C 9/28* (2006.01)
*B60C 13/00* (2006.01)
*B60C 15/00* (2006.01)
*B60C 9/18* (2006.01)
*B60C 9/02* (2006.01)

(52) U.S. Cl.
CPC .......... *B60C 15/0045* (2013.01); *B60C 15/06* (2013.01); *B60C 2009/0223* (2013.01); *B60C 2013/007* (2013.01); *B60C 2200/06* (2013.01)

(56) References Cited

U.S. PATENT DOCUMENTS

| | | | | |
|---|---|---|---|---|
| 3,554,259 | A | * | 1/1971 | Webb ........................ B60C 3/04 152/209.8 |
| 3,717,190 | A | * | 2/1973 | Boileau ............... B60C 17/0009 152/528 |
| 4,972,893 | A | * | 11/1990 | Komai ...................... B60C 9/08 152/553 |
| 5,058,646 | A | * | 10/1991 | Kajikawa ............ B60C 17/0027 152/454 |
| 5,060,707 | A | | 10/1991 | Sumikawa |
| 5,285,835 | A | * | 2/1994 | Ueyoko ................... B60C 11/00 152/209.14 |
| 5,361,820 | A | | 11/1994 | Adachi |
| 5,707,462 | A | * | 1/1998 | Kikuchi ................ B60C 1/0025 152/209.1 |
| 5,743,976 | A | * | 4/1998 | Pena ....................... B60C 15/05 152/539 |
| 8,336,593 | B2 | * | 12/2012 | Harikae .................... B60C 9/22 152/527 |
| 2010/0181001 | A1 | | 7/2010 | Van Den Nieuwenhuyzen et al. |

FOREIGN PATENT DOCUMENTS

| | | | |
|---|---|---|---|
| DE | 2737234 | * | 3/1979 |
| FR | 1391061 | * | 3/1965 |
| GB | 1478660 | * | 7/1977 |
| GB | 2138367 | * | 10/1984 |
| JP | S62-050205 | | 3/1987 |
| JP | H02-053612 | | 2/1990 |
| JP | H03-178805 | | 8/1991 |
| JP | H04-201605 | | 7/1992 |
| JP | H04-221204 | | 8/1992 |
| JP | 06106924 | * | 4/1994 |
| JP | H06-234308 | | 8/1994 |
| JP | 2000-094904 | | 4/2000 |
| JP | 2000-185513 | | 7/2000 |
| JP | 2001-301416 | | 10/2001 |
| JP | 2003-011624 | | 1/2003 |
| JP | 2008-001138 | | 1/2008 |
| JP | 2010516529 | | 5/2010 |
| WO | WO 2008/098639 | | 8/2008 |

OTHER PUBLICATIONS

Machine translation of DE 1927047, 1970.*
Machine translation of JP 06106924, 1994.*
Machine translation ofFR 1391061, 1965.*
International Search Report for International Application No. PCT/JP2017/035863 dated Jan. 9, 2018, 4 pages, Japan.

* cited by examiner

BIAS TIRE

TECHNICAL FIELD

The present technology relates to a bias tire.

BACKGROUND ART

Conventionally, a tire for industrial vehicles is set for high load usage and high pressure. For example, a heavy duty bias tire which is used on a gantry crane in a harbor area or the like is set for high load usage and the center of gravity of the bias tire is high. Therefore, the bias tire is easily influenced by unbalanced load and vehicle fluctuation due to over-deflection, and tire failure may occur. However, it is difficult to set further high pressure because of wheel strength and operation management issues.

Japan Unexamined Patent Publication No. 2008-001138 describes a pneumatic tire including a cushioning pad disposed between plies which form a carcass layer near a shoulder portion. Japan Unexamined Patent Publication No. 2000-185513 describes a heavy duty pneumatic tire including a reinforcing rubber layer located radially outward from a carcass position corresponding to a tire maximum width position. Japan Unexamined Patent Publication No. 2010-516529 describes a tire including a carcass reinforcing member with a crown reinforcing material being disposed radially outward therefrom, the carcass reinforcing material being formed by a plurality of metal reinforcing elements coated with a rubber coating material.

However, the technologies described in Japan Unexamined Patent Publication Nos. 2008-001138, 2000-185513, and 2010-516529 do not sufficiently improve steering stability and durability and there is room for enhancement.

SUMMARY

The present technology provides a bias tire with improved steering stability and durability.

The present technology includes two or more carcass layers, at least one belt disposed outward from the two or more carcass layers in a radial direction, and a reinforcing rubber layer between carcass plies included in a carcass layer of the two or more carcass layers. A width of a widest belt with the widest width of the at least one belt is 110% or more and 150% or less of a tread developed width, and an upper end portion of the reinforcing rubber layer located outward in the tire radial direction is apart 30 mm or more from an end portion of the widest belt.

Preferably, the reinforcing rubber layer is formed by rubber with a 100% elongation modulus of 1.55 MPa or more.

Preferably, a maximum inter-cord distance of the carcass plies adjacent to each other that sandwich the reinforcing rubber layer is 5 mm or more and 30 mm or less.

Preferably, a position of a lower end portion of the reinforcing rubber layer located inward in tire radial direction is further inward in the tire radial direction than a tire maximum width position, and a vertical distance from a tire bead heel position is 150% or more of a flange height of a standard rim.

Preferably, two or more carcass plies are disposed inward from the reinforcing rubber layer.

Preferably, a rubber forming the reinforcing rubber layer is identical to rubber covering cords of the carcass plies.

Preferably, cords of the two carcass plies adjacent to each other that sandwich the reinforcing rubber layer are disposed to intersect each another.

Preferably, the cords of the two carcass plies adjacent to each other that sandwich the reinforcing rubber layer have an angle with respect to the tire radial direction.

According to the bias tire of the present technology, specifying a shape and a position of a reinforced rubber inserting side portion reduces deflection and improves steering stability and durability.

DETAILED DESCRIPTION

Embodiments of the present technology are described in detail below with reference to the drawings. However, the technology is not limited by the embodiments. Constituents of the embodiments include elements that are essentially identical or that can be substituted or easily conceived by one skilled in the art. Note that, in the drawings, identical or substantially similar components to those of other drawings have the same reference signs, and descriptions of those components are either simplified or omitted.

Figure 1:
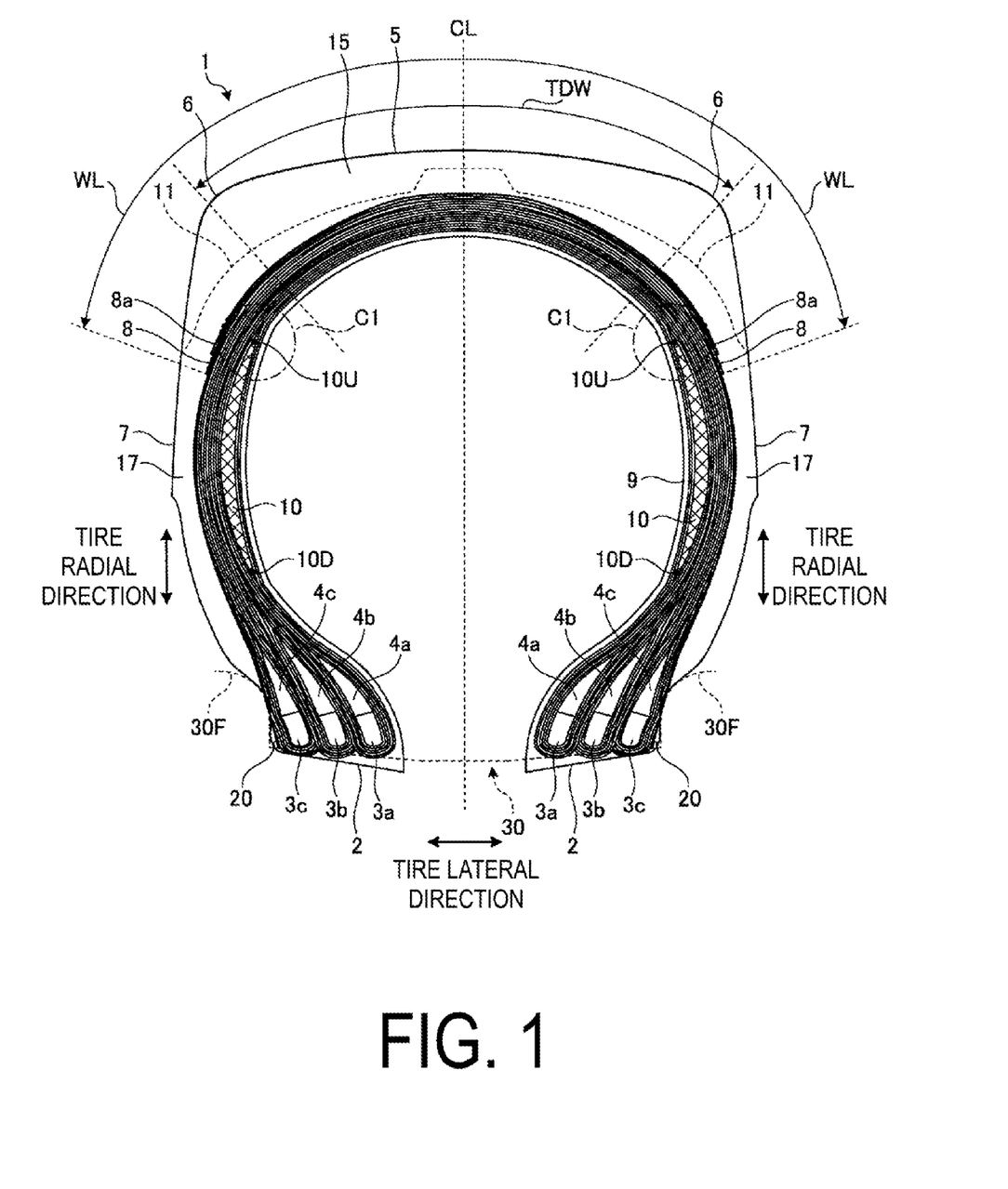
FIG. 1 is a meridian cross-sectional view of a bias tire according to an embodiment.

Next, a bias tire of an embodiment of the present technology will be described. FIG. 1 is a cross-sectional view in a tire meridian direction of a bias tire according to an embodiment. FIG. 1 is a cross-sectional view in the tire radial direction. Additionally, FIG. 1 illustrates a bias tire for a gantry crane used in a harbor area or the like as an example of the bias tire.

In reference to FIG. 1, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. Additionally, "tire radial direction" refers to the direction orthogonal to the tire rotation axis. "Tire lateral direction" refers to the direction parallel with the tire rotation axis. "Tire circumferential direction" refers to the direction around the tire rotation axis.

In FIG. 1, a bias tire 1 according to the present embodiment has an annular structure centered on a tire rotation axis. The bias tire 1 includes bead cores 3a, 3b, 3c, a plurality of bead cores (three in FIG. 1) embedded in each of the left and right pair of bead portions 2, 2. FIG. 1 illustrates a rim 30 with a dashed line. The bias tire 1 illustrated in FIG. 1 is not mounted on a rim. When the bias tire 1 is mounted on the rim 30, end portions of the bead portions 2, 2 come into contact with the rim 30 (not illustrated).

The bias tire 1 includes a pair of a plurality of carcass layers 4a, 4b, 4c at each of the bead cores 3a, 3b, 3c. The carcass layers have cord directions in different layers that cross with one another. The pair of the plurality of carcass layers 4a, 4b, 4c is disposed such that the cord directions of adjacent layers cross one other and are disposed turned up from inward to outward in the tire lateral direction.

Additionally, carcass plies of the carcass layers 4a, 4b, 4c are made by performing a rolling process on coating rubber-covered carcass cords made of steel or an organic fiber material (for example, aramid, nylon, polyester, rayon, or the like). Each of the carcass plies of the carcass layers 4a, 4b, 4c may be the same or different. For example, the outermost carcass ply of the plurality of carcass plies which are turned back may have a different degree of vulcanization than those of other carcass plies. In this manner, the bias tire 1 includes two or more carcass layers.

The bias tire 1 includes a groove 11 in a tread portion 5. In FIG. 1, the bottom of the groove 11 is illustrated with a dashed line. Both ends of tread portion 5 in the tire lateral direction are formed as shoulder portions 6, and sidewall portions 7 are provided from the shoulder portions 6 to a predetermined position inward in the tire radial direction. The sidewall portions 7 are disposed at two positions on either side of the bias tire 1 in the tire lateral direction. The sidewall portions 7, 7 include a pair of sidewall rubbers 17, 17.

Further, the bias tire 1 includes fiber reinforced layers, belts 8, 8a located on the outer circumferential side of the carcass layer 4c in the tread portion 5. An innerliner 9 is formed along the carcass layer 4a on the inner side of the bias tire 1.

The tread rubber 15 is disposed outward from the carcass layers 4a, 4b, 4c and the belts 8, 8a in the tire radial direction, and forms the tread portion 5. The pair of sidewall rubbers 17, 17 is disposed outward from the carcass layer 4a, 4b, 4c in the tire lateral direction and constitute left and right sidewall portions 7, 7. The pair of rim cushion rubbers 20, 20 is disposed inward from the left and right bead cores 3a, 3b, 3c and the turned back portions of the carcass layer 4a, 4b, 4c in the tire radial direction. The pair of rim cushion rubbers 20, 20 constitute contact surfaces of the left and right bead portions 2, 2 with flanges 30F of the rim 30.

A belt width WL of the belt 8 which is the widest width belt (widest belt) of the bias tire 1 is from 110% to 150% of a tread developed width TDW. "Tread developed width TDW" refers to the linear distance between both ends of the tread portion 5 of the bias tire 1 in a developed view, measured when the bias tire 1 is mounted on a regular rim, inflated to the regular internal pressure, and no load is applied. The tread developed width TDW is for example 450 mm and the widest belt width WL is for example 570 mm.

The bias tire 1 includes a reinforcing rubber layer 10 at the sidewall portion 7 of the innermost carcass layer 4a. The reinforcing rubber layer 10 functions as a reinforcing portion for reinforcing mainly the sidewall portion 7. The reinforcing rubber layer 10 is disposed between the carcass plies in the carcass layer 4a. In other words, the reinforcing rubber layer 10 is sandwiched between the carcass plies. Sandwiching the reinforcing rubber layer 10 between the carcass plies, i.e., the fiber reinforced layers, prevents separation between the carcass and reinforced rubber due to rigidity difference between carcass ply and reinforcing rubber layer, and ensures sufficient rigidity. Therefore, deflection may be suppressed and accordingly durability and steering stability are improved.

The reinforcing rubber layer 10 is not disposed between a turned back portion of the carcass ply and a body portion in front of the turned back portion, but is inserted in the body portion in front of the turned back portion. Such a structure reduces the occurrence of the separation and improves durability.

As shown in FIG. 1, in a meridian direction cross section, the reinforcing rubber layer 10 includes an outer end portion in the tire radial direction defined as an upper end portion 10U and an inner end portion in the tire radial direction defined as a lower end portion 10D. The upper end portion 10U of the reinforcing rubber layer 10 is 30 mm or more apart from an end portion of the widest belt 8 in the tire lateral direction. This means that in FIG. 1, the end portion of the widest belt 8 is not disposed within a circle C1 that is centered on the upper end portion 10U of the reinforcing rubber layer 10 and has a radius of 30 mm. In other words, the end portion of the widest belt 8 is disposed outward from the circle C1 centered on the upper end portion 10U of the reinforcing rubber layer 10.

Disposing the upper end portion 10U of the reinforcing rubber layer 10 apart from the end portion (belt edge) 30 mm or more enables the position of the reinforcing rubber layer 10 to avoid the portion with high rigidity difference, and does not damage the original durability. When the position of the upper end portion 10U of the reinforcing rubber layer 10 is nearer from the end portion of the widest belt 8 in comparison with the above case, strain due to the rigidity difference increases and may damage the durability.

Also, preferably, the distance between the position of the upper end portion 10U of the reinforcing rubber layer 10 and the end portion of the widest belt 8 is 40% or less of the width of the widest belt. When the distance between the position of the upper end portion 10U of the reinforcing rubber layer 10 and the end portion of the widest belt 8 is more than the above value, the side portion with a large deflection deviates significantly and the effect to reduce the deflection is not obtained sufficiently.

Figure 2:
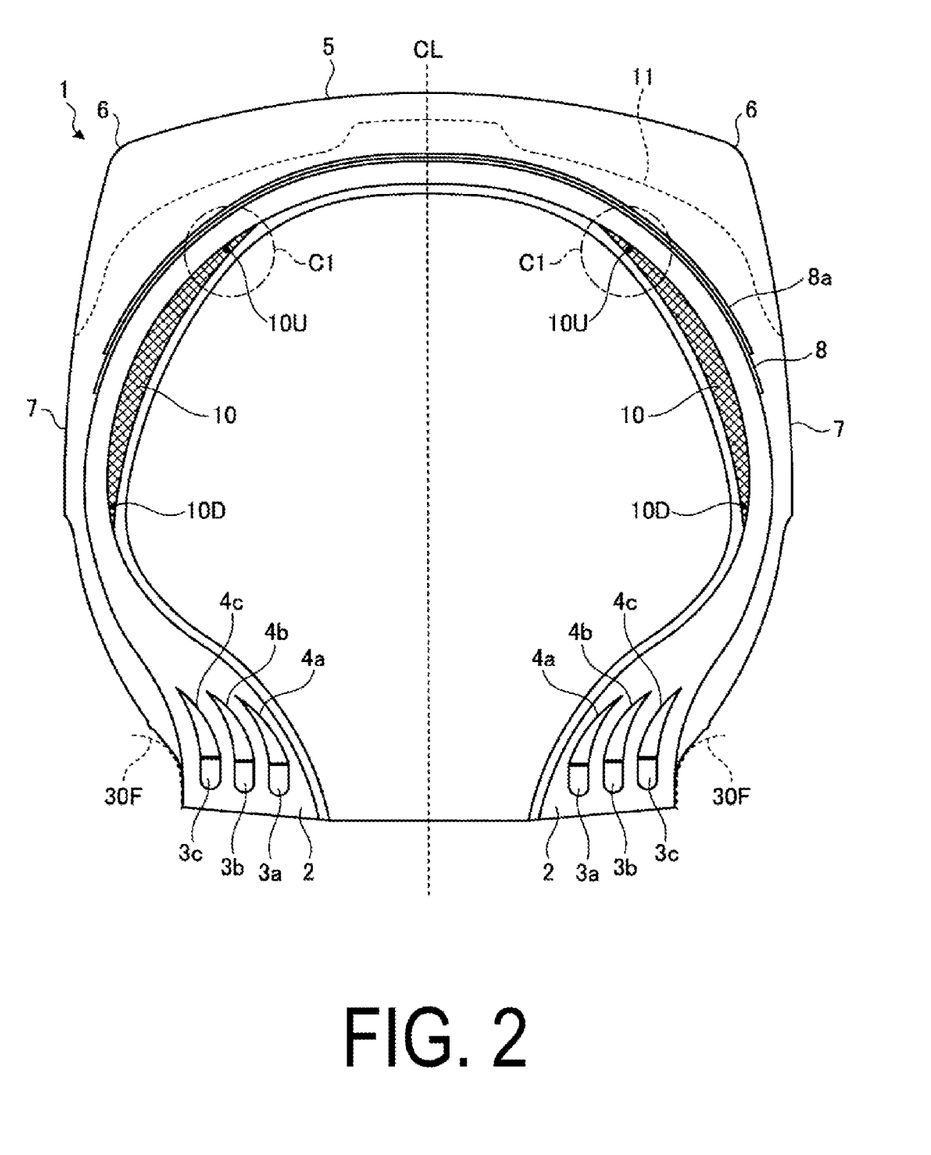
FIG. 2 is a diagram of the bias tire when an upper end portion of the reinforcing rubber layer is located near to equatorial plane.

When the position of the upper end portion 10U of the reinforcing rubber layer 10 is located apart from the end portion of the widest belt 8 more than 30 mm, the position of the upper end portion 10U may be disposed close to the equatorial plane CL. FIG. 2 is a diagram illustrating a configuration in which the position of the upper end portion 10U of the reinforcing rubber layer 10 is located near the equatorial plane CL. In FIG. 2, the carcass plies configuring the carcass layers 4a, 4b, 4c are omitted. In the reinforcing rubber layer 10 illustrated in FIG. 2, the position of the upper end portion 10U is disposed closer to the equatorial plane CL in comparison with the case as illustrated in FIG. 1. In the reinforcing rubber layer 10 illustrated in FIG. 2, the position of the upper end portion 10U is more than 30 mm apart from the end portion of the widest belt 8. In other words, the end portion of the widest belt 8 is disposed outward from the circle C1 that is centered on the upper end portion 10U of the reinforcing rubber layer 10.

Figure 3:
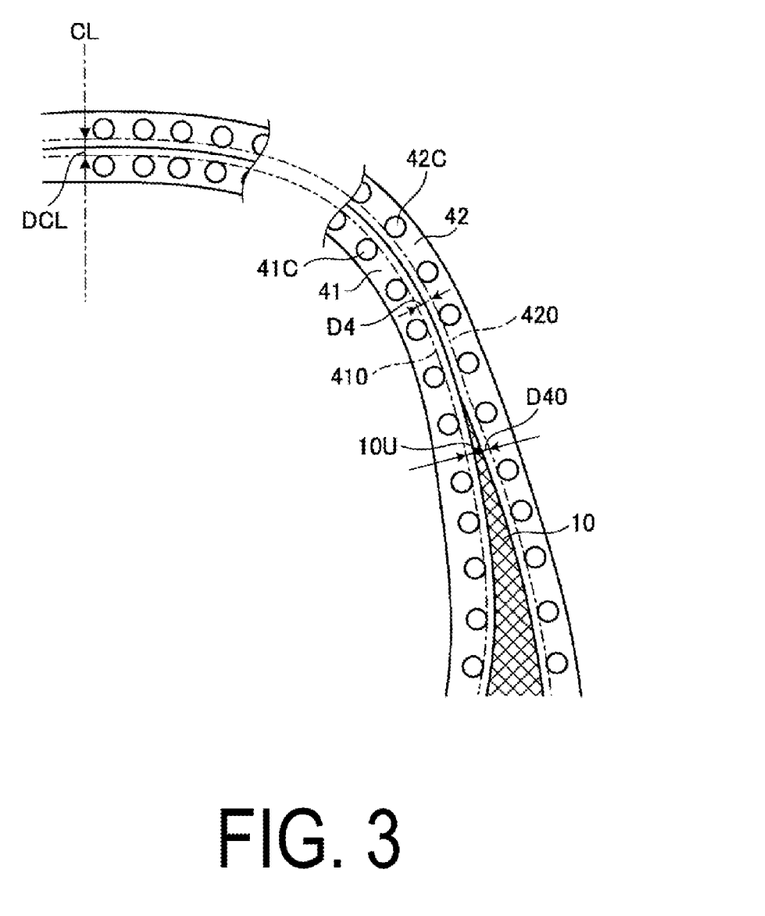
FIG. 3 is an explanatory diagram of an inter-cord distance.

The upper end portion 10U of the reinforcing rubber layer is disposed at the position twice the inter-cord distance in reference to the inter-cord distance at the position crossing with the equatorial plane CL. FIG. 3 is an explanatory diagram of the inter-cord distance. In FIG. 3, a carcass ply 41 and a carcass ply 42 are adjacent each other. The carcass ply 41 is inward in the tire radial direction and the carcass ply 42 is outward in the tire radial direction. In FIG. 3, carcass plies other than the carcass ply 41 and the carcass ply 42 are omitted. The carcass ply 41 includes a plurality of carcass cords 41C and the carcass ply 42 includes a plurality of carcass cords 42C. The inter-cord distance is a distance D4 between an imaginary line 410 joining upper edge positions of the plurality of carcass cords 41C of the carcass ply 41 and an imaginary line 420 joining lower edge positions of the plurality of carcass cords 42C of the carcass ply 42. The inter-cord distance of a position crossing with the equatorial plane CL is a distance DCL. When the distance D4 between the imaginary line 410 and the imaginary line 420 is the inter-cord distance D40 which is twice of the distance DCL, a midpoint of a straight line crossing the reinforcing rubber layer 10 is the upper end portion 10U of the reinforcing rubber layer 10.

The inter-cord distance D4 is the thicknesses of the rubber material between belt cords of the adjacent carcass plies, and is measured when the tire is mounted on a specified rim, inflated to the specified internal pressure, and in an unloaded state. Specifically, for example, a single tire is applied to the imaginary line of a tire profile measured by a laser profiler and fixed with tape or the like. Next, the distance of the adjacent carcass plies to be measured in the tire radial direction between the lower end position of the carcass cord of the carcass ply on the outer side and the upper end position of the carcass cord of the carcass ply on the inner side is measured using calipers or the like, and the value is taken to be the inter-cord distance. The laser profiler used can be, for example, a tire profile measuring device (available from Matsuo Co., Ltd.).

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Figure 4:
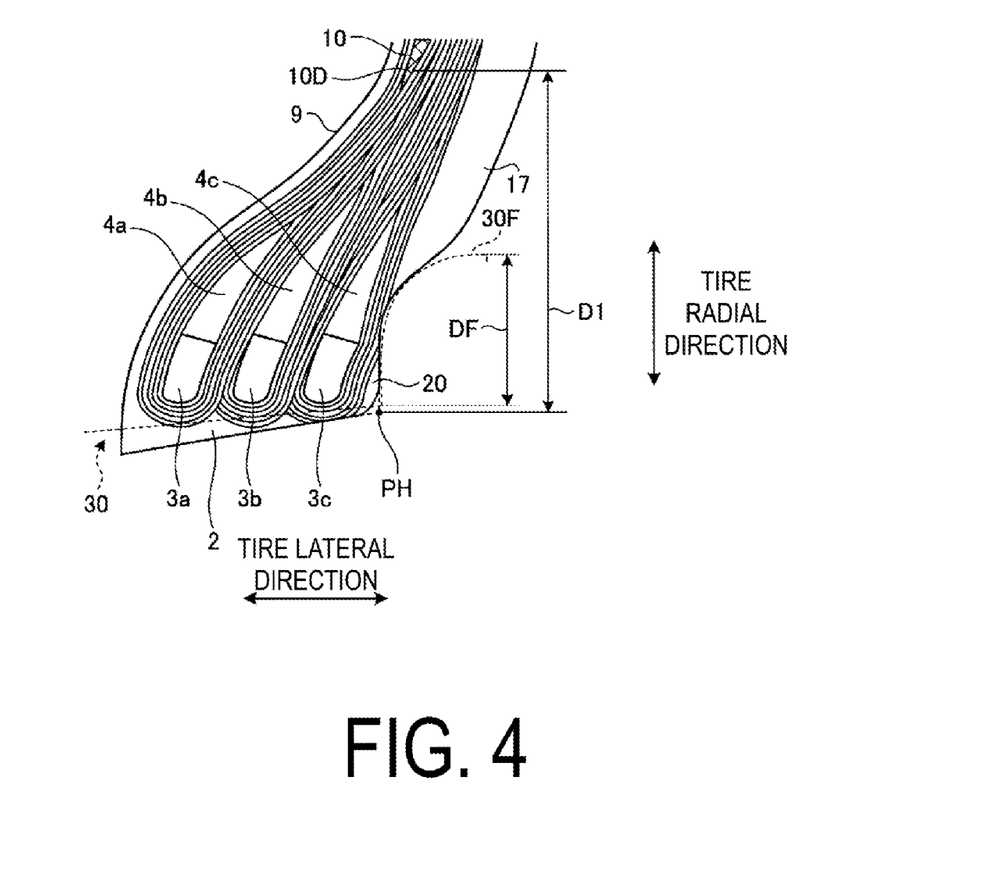
FIG. 4 is an explanatory diagram of a lower end portion of the reinforcing rubber layer.

Next, the lower end portion 10D of the reinforcing rubber layer 10 located inward in the tire radial direction is described. FIG. 4 is an explanatory diagram of the lower end portion 10D of the reinforcing rubber layer 10. In FIG. 4, the position of the lower end portion 10D of the reinforcing rubber layer 10 is lower (further inward in the tire radial direction) than the position of tire maximum width, and a vertical distance D1 from a tire bead heel position PH is 150% or more of a height DF of a flange 30F of the standard rim. The tire bead heel position PH is an intersection point of each of the extensions of linear portions of a cross section in the tire meridian direction of the bead portion 2.

In the outer side of a separation point from the flange 30F of the rim 30 in the tire radial direction, strain is the largest near the height DF of the flange 30F of the rim 30 because the bias tire 1 is not fixed. Thus, by disposing the lower end portion 10D of the reinforcing rubber layer 10 at a position apart from the portion, the original durability of the bias tire 1 is not damaged and a deflection is effectively reduced. When the lower end portion 10D of the reinforcing rubber layer 10 is further inward in the tire radial direction, malfunctions tend to occur because the lower end portion is in a region of a strain concentration.

Figure 5:
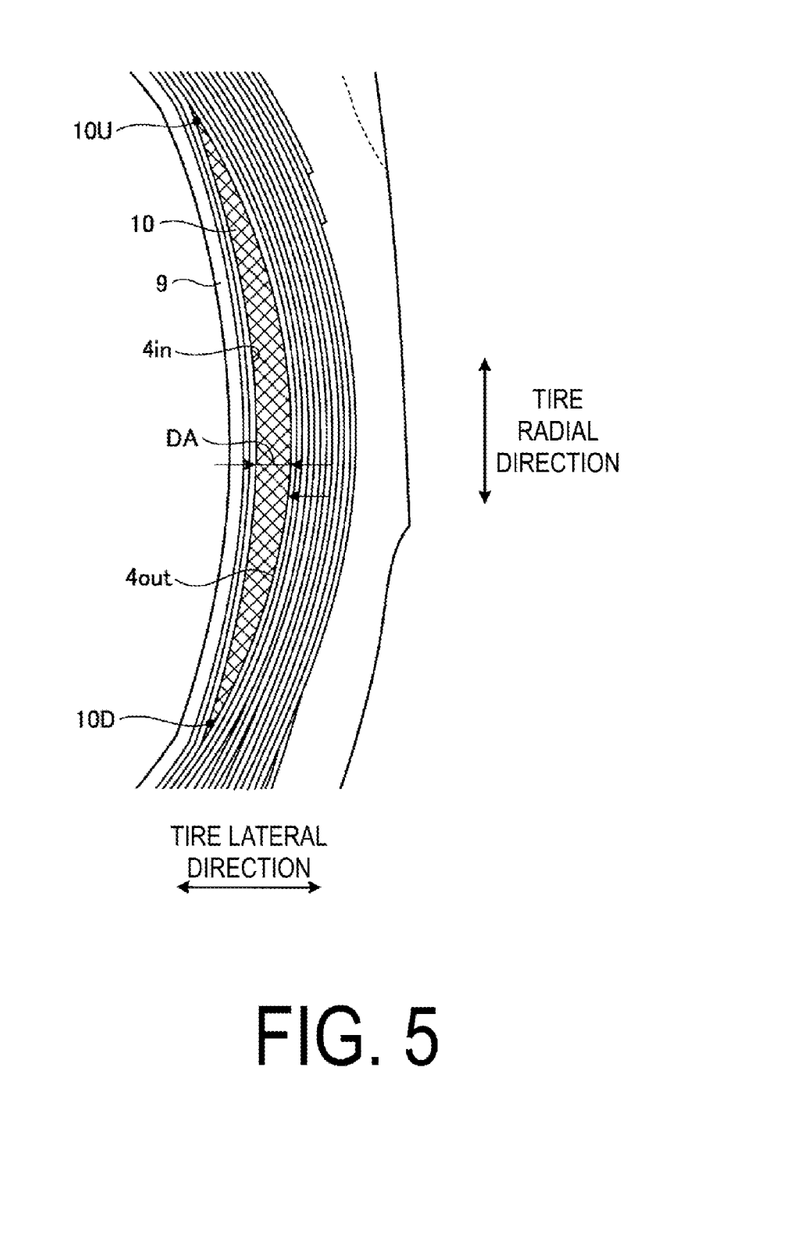
FIG. 5 is an enlarged diagram of the sidewall portion of a cross-sectional view in the bias tire meridian direction as shown in FIG. 1.

FIG. 5 is an enlarged diagram of the sidewall portion 7 of a cross-sectional view in a meridian direction of the bias tire 1 according to FIG. 1. In FIG. 5, physical properties of a rubber material of the carcass plies sandwiching the reinforcing rubber layer 10, i.e. an inner side carcass ply $4_{in}$ and an outer side carcass ply $4_{out}$, are preferably the same as those of the reinforcing rubber layer 10. Accordingly, separation between rubber and rubber due to differences in rubber physical properties may be reduced.

The carcass ply $4_{in}$ and the carcass ply $4_{out}$ sandwiching the reinforcing rubber layer 10 are set so that the maximum value of the inter-cord distance D4, i.e. maximum inter-cord distance DA, is preferably 5 mm or more and 30 mm or less. Further, preferably, for example, the maximum inter-cord distance is 17 mm. When the maximum inter-cord distance is less than 5 mm, the thickness of the reinforcing rubber layer 10 is thin and a sufficient reduction in deflection cannot be expected. Also, when the maximum inter-cord distance is more than 30 mm, the thickness of the reinforcing rubber layer 10 is thick and strain due to rigidity difference with surrounding members increases and durability is reduced.

Also, preferably, cords of the carcass ply $4_{in}$ and cords of the carcass ply $4_{out}$ which are adjacent to each other and sandwiching the reinforcing rubber layer 10, are disposed to intersect each other. Also, preferably, these cords intersect with and have an angle with respect to the tire radial direction. An intersection angle of each cord of the carcass plies is preferably between ±30 degrees and ±60 degrees in the tire radial direction. Inserting the reinforcing rubber layer 10 between the carcass plies with intersecting cord enables highly effective strain reduction.

Preferably, two or more carcass plies are disposed further inward than the reinforcing rubber layer 10 in the tire radial direction. When the number of carcass ply is two or less, the inner side rigidity of the reinforcing rubber layer 10 is not sufficient and effects against separation between the reinforcing rubber layer 10 and carcass ply cannot be expected. The number of carcass plies in the inner side of the reinforcing rubber layer 10 in the tire radial direction is preferably two or more and five or less. When there are five or more carcass plies, rigidity becomes too high.

Also, to ensure the rigidity of the outer side of the reinforcing rubber layer 10 in the tire radial direction, the number of carcass plies in the outer side of the reinforcing rubber layer 10 is for example, preferably four or more for bias tires used in gantry cranes. It is not necessary to use carcass plies identical to each other. For example, only an outer side carcass ply in five carcass plies may have different strength compared with other carcass plies.

In the following part, characteristics of the rubber material forming the reinforcing rubber layer 10 are explained. The 100% elongation modulus of rubber forming the reinforcing rubber layer 10 is preferably 1.55 MPa or more and 2.50 MPa or less; and more preferably 1.60 MPa or more and 2.30 MPa or less. When the 100% elongation modulus is less than 1.55 MPa, deflection does not reduce sufficiently. Also, when the 100% elongation modulus of rubber forming the reinforced rubber 10 is 2.5 MPa or more, strain increases due to a hardness difference compared with surrounding members, and durability decreases. Further, in the rubber forming the reinforcing rubber layer 10, for example tan δ (60° C.) is 0.03 or more and 0.09 or less; and elongation at break is 500% or more and 700% or less. Preferably, tan δ (60° C.) at rubber forming the reinforcing rubber layer 10 is 0.05 or more and 0.07 or less. Preferably, the elongation at break of the rubber forming the reinforcing rubber layer 10 is 580% or more and 600% or less.

Next, measurement methods of physical properties of the rubber forming the reinforcing rubber layer 10 are described. A vulcanization rubber sample under press vulcanization at 160° C. for 20 minutes is evaluated for the 100% elongation modulus and tan δ (60° C.) using the following method. For a 100% elongation modulus evaluation, Dumbbell-shaped JIS (Japanese Industrial Standard) No. 3 test pieces (thickness: 2 mm) were punched out from the vulcanization rubber sample in accordance with JIS K6251. Tests were conducted at standard temperature at a tensile test speed of 500 mm/minute, and the 100% elongation modulus (100% elongation tensile strength) were measured. The tan δ (60° C.) of the vulcanization rubber sample was measured using a viscoelasticity spectrometer (available from Toyo Seiki Seisaku-sho, Ltd.) under the following conditions: 10% initial strain, ±2% amplitude, 20 Hz frequency, and 60° C. temperature.

EXAMPLE 1

A bias tire 1 according to the present embodiment was evaluated regarding steering stability performance and durability performance. With regard to steering stability performance, a driving test was performed at a harbor area using actual vehicles mounted with tires with a size of 1800-25 40PR. During the driving test, fluctuation (amount of lateral vibration) was measured for driving at the same speed. Based on a sensory evaluation by the operator, the evaluation is performed in reference to the conventional example and the evaluation results are expressed as index values. With this evaluation, larger numbers are more preferable.

For durability performance, tires with a size of 1800-25 40PR were mounted on rims of 25×13.00/2.5. The tires were adjusted to the standard maximum air pressure (1000 kPa), and the tires were attached to an indoor drum testing machine. At 100% of the standard maximum load (1700 kg), the tire was run at a speed of 5 km/h. The load increased with 10% every 12 hours and the running time until tire failure was measured.

With regard to the bias tire 1 according to the present embodiment, the following items are evaluated: distance between the position of the upper end portion 10U of the reinforcing rubber layer 10 and the end portion of the widest belt 8, 100% elongation modulus of the reinforcing rubber layer 10, maximum inter-cord distance of a part of the reinforcing rubber layer 10, position of the lower end 10D of the reinforcing rubber layer 10, number of carcass plies inward from the reinforcing rubber layer 10 in the tire radial direction, and whether physical properties of the reinforcing rubber layer 10 and of the rubber of the carcass plies are the same.

In Example 1 to Example 16, the distance between upper edge position 10U of the reinforcing rubber layer 10 and the end portion of the widest belt 8 is 30, 35 mm. In Example 1 to Example 16, the 100% elongation modulus of the reinforcing rubber layer 10 is any one of 1.4, 1.55, 1.6, 2.0, 2.3, 2.5. In Example 1 to Example 16, the maximum inter-cord distance of the reinforcing rubber layer portion is any one of 4, 5, 18, 30 mm. In Example 1 to Example 16, the position of the lower end portion 10D of the reinforcing rubber layer 10 is set to be any one of a position higher than a tire maximum width position, the tire maximum width position, the midpoint between the tire maximum width position and a position of 150% of the flange height 30F of the rim 30. In Example 1 to Example 16, the number of carcass plies inward from the reinforcing rubber layer 10 in the tire radial direction is any one of 1, 2, 4.

In the evaluation, a bias tire without the reinforcing rubber layer 10 between carcass plies was used as a conventional example. In Comparative Example 1, the reinforcing rubber layer 10 is provided, the distance between the upper end portion 10U of the reinforcing rubber layer 10 and an end portion of the widest belt 8 is 25 mm, the 100% elongation modulus of the reinforcing rubber layer 10 is 1.4 MPa, the maximum inter-cord distance of the reinforcing rubber layer 10 is 4 mm, the lower end portion 10D of the reinforcing rubber layer 10 is higher than the tire maximum width position, the number of carcass plies inward from the reinforcing rubber layer 10 in the tire radial direction is one, and physical properties of the reinforcing rubber layer 10 and of the rubber of the carcass plies are different.

Table 1 and Table 2 indicate measurement results as an index value where Conventional Example is 100. In Table 1 and Table 2, larger values indicate superior steering stability and durability performance. According to Example 1 to Example 16, preferable results are obtained in the following conditions: the distance between the upper end portion 10U of the reinforcing rubber layer 10 and an end portion of the widest belt 8 is 30 mm or more, the 100% elongation modulus of the reinforcing rubber layer 10 is 1.55 MPa or more, the maximum inter-cord distance of the reinforcing rubber layer 10 is 5 mm or more and 30 mm or less, the lower end portion 10D of the reinforcing rubber layer 10 is lower (further inward in the tire radial direction) than the tire maximum width position, the vertical distance is 150% or more of the flange height 30F of the standard rim, the number of carcass plies inward from the reinforcing rubber layer in the tire radial direction is 2 or more, and the rubber material of the reinforcing rubber layer 10 and the rubber of the carcass plies are identical in physical properties.

TABLE 1

| Content | Conventional Example | Comparative Example 1 | Example 1 | Example 2 | Example 3 |
|---|---|---|---|---|---|
| Reinforcing rubber layer between carcass plies | No | Yes | Yes | Yes | Yes |
| Distance between upper edge position of reinforcing rubber layer and end portion of the widest belt | — | 25 | 30 | 35 | 35 |
| 100% elongation modulus of reinforced rubber (MPa) | — | 1.4 | 1.4 | 1.4 | 1.55 |
| Maximum inter-cord distance of reinforcing rubber layer portion (mm) | — | 4 | 4 | 4 | 4 |

TABLE 1-continued

| | | | | | |
|---|---|---|---|---|---|
| Lower end position of reinforcing rubber layer | — | Higher than maximum width position | Higher than maximum width position | Higher than maximum width position | Higher than maximum width position |
| Number of carcass plies inward from reinforcing rubber layer | — | 1 | 1 | 1 | 1 |
| Reinforcing rubber layer and Carcass ply | — | Different rubber | Different rubber | Different rubber | Different rubber |
| Steering stability performance | 100 | 110 | 115 | 115 | 116 |
| Durability performance | 100 | 95 | 105 | 115 | 116 |

| Content | Example 4 | Example 5 | Example 6 | Example 7 | Example 8 |
|---|---|---|---|---|---|
| Reinforcing rubber layer between carcass plies | Yes | Yes | Yes | Yes | Yes |
| Distance between upper edge position of reinforcing rubber layer and end portion of the widest belt | 35 | 35 | 35 | 35 | 35 |
| 100% elongation modulus of reinforced rubber (MPa) | 1.6 | 1.6 | 1.6 | 1.6 | 1.6 |
| Maximum inter-cord distance of reinforcing rubber layer portion (mm) | 4 | 5 | 18 | 30 | 18 |
| Lower end position of reinforcing rubber layer | Higher than maximum width position | Higher than maximum width position | Higher than maximum width position | Higher than maximum width position | Maximum width position |
| Number of carcass plies inward from reinforcing rubber layer | 1 | 1 | 1 | 1 | 1 |
| Reinforcing rubber layer and Carcass ply | Different rubber | Different rubber | Different rubber | Different rubber | Different rubber |
| Steering stability performance | 117 | 118 | 119 | 120 | 121 |
| Durability performance | 117 | 118 | 121 | 118 | 123 |

TABLE 2

| Content | Example 9 | Example 10 | Example 11 | Example 12 |
|---|---|---|---|---|
| Reinforcing rubber layer between carcass plies | Yes | Yes | Yes | Yes |
| Distance between upper edge position of reinforcing rubber layer and end portion of the widest belt | 35 | 35 | 35 | 35 |
| 100% elongation modulus of reinforced rubber (MPa) | 1.6 | 1.6 | 1.6 | 1.6 |
| Maximum inter-cord distance of reinforcing rubber layer portion (mm) | 18 | 18 | 4 | 4 |
| Lower end position of reinforcing rubber layer | Midpoint between maximum width position and position of 150% of rim flange height | Position of 150% of rim flange height | Midpoint between maximum width position and position of 150% of rim flange height | Midpoint between maximum width position and position of 150% of rim flange height |
| Number of carcass plies inward from reinforcing rubber layer | 1 | 1 | 2 | 4 |
| Reinforcing rubber layer and Carcass ply | Different rubber | Different rubber | Different rubber | Different rubber |
| Steering stability performance | 123 | 121 | 125 | 127 |
| Durability performance | 125 | 123 | 127 | 129 |

TABLE 2-continued

| Content | Example 13 | Example 14 | Example 15 | Example 16 |
|---|---|---|---|---|
| Reinforcing rubber layer between carcass plies | Yes | Yes | Yes | Yes |
| Distance between upper edge position of reinforcing rubber layer and end portion of the widest belt | 35 | 35 | 35 | 35 |
| 100% elongation modulus of reinforced rubber (MPa) | 1.6 | 2.0 | 2.3 | 2.5 |
| Maximum inter-cord distance of reinforcing rubber layer portion (mm) | 4 | 4 | 4 | 4 |
| Lower end position of reinforcing rubber layer | Midpoint between maximum width position and position of 150% of rim flange height | Midpoint between maximum width position and position of 150% of rim flange height | Midpoint between maximum width position and position of 150% of rim flange height | Midpoint between maximum width position and position of 150% of rim flange height |
| Number of carcass plies inward from reinforcing rubber layer | 4 | 4 | 4 | 4 |
| Reinforcing rubber layer and Carcass ply | Same rubber | Same rubber | Same rubber | Same rubber |
| Steering stability performance | 127 | 130 | 131 | 130 |
| Durability performance | 131 | 133 | 128 | 122 |

The invention claimed is:

1. A bias tire, comprising:
   two or more carcass layers each including a plurality of carcass plies;
   two or more pairs of bead cores;
   at least one belt disposed outward from the two or more carcass layers in a tire radial direction; and
   a reinforcing rubber layer disposed sandwiched between carcass plies included in a single carcass layer of the two or more carcass layers,
   cords of the carcass plies which are adjacent to each other and sandwich the reinforcing rubber layer being disposed to intersect each other at an angle with respect to a tire radial direction of between ±30 degrees and ±60 degrees,
   a width of a widest belt with the widest width of the at least one belt being 110% or more and 150% or less of a tread development width,
   a position of an upper end portion of the reinforcing rubber layer located outward in the tire radial direction being apart 30 mm or more from an end portion of the widest belt,
   each one of the carcass layers being wrapped around a respective separate one of the pairs of bead cores,
   the carcass plies sandwiching the reinforcing rubber layer wrapping around a same pair of bead cores of the two or more pairs of bead cores, and
   a maximum inter-cord distance of the carcass plies adjacent to each other that sandwich the reinforcing rubber layer being 5 mm or more and 30 mm or less.

2. The bias tire according to claim 1, wherein the reinforcing rubber layer is formed by rubber with a 100% elongation modulus of 1.55 MPa or more.

3. The bias tire according to claim 2, wherein
   a position of a lower end portion of the reinforcing rubber layer located inward in the tire radial direction is further inward in the tire radial direction than a tire maximum width position; and
   a vertical distance from a tire bead heel position is 150% or more of a flange height of a standard rim.

4. The bias tire according to claim 3, wherein two or more carcass plies are disposed inward from the reinforcing rubber layer.

5. The bias tire according to claim 4, wherein a rubber forming the reinforcing rubber layer is identical to a rubber covering cords of the carcass plies.

6. The bias tire according to claim 1, wherein
   a position of a lower end portion of the reinforcing rubber layer located inward in the tire radial direction is further inward in the tire radial direction than a tire maximum width position; and
   a vertical distance from a tire bead heel position is 150% or more of a flange height of a standard rim.

7. The bias tire according to claim 1, wherein two or more carcass plies are disposed inward from the reinforcing rubber layer.

8. The bias tire according to claim 1, wherein a rubber forming the reinforcing rubber layer is identical to a rubber covering cords of the carcass plies.

9. The bias tire according to claim 1, wherein the belt includes fiber reinforcements.

10. The bias tire according to claim 1, wherein the two or more carcass plies comprises three or more carcass plies and the two or more pairs of bead cores comprises three or more pairs of bead cores.

11. The bias tire according to claim 1, wherein the single carcass layer is closest among the two or more carcass layers to a tire cavity.

12. The bias tire according to claim 1, wherein the two or more carcass layers comprises at least three carcass layers and the two or more pairs of bead cores comprises at least three pairs of bead cores.

13. The bias tire according to claim 12, wherein the single carcass layer is closest among the at least three carcass layers to a tire cavity.

* * * * *